Oct. 8, 1968     I. J. ARONS     3,404,699
SAFETY VALVE WITH FUSIBLE PIN
Filed Feb. 25, 1966
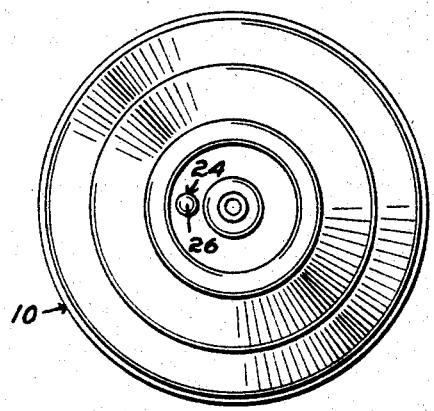
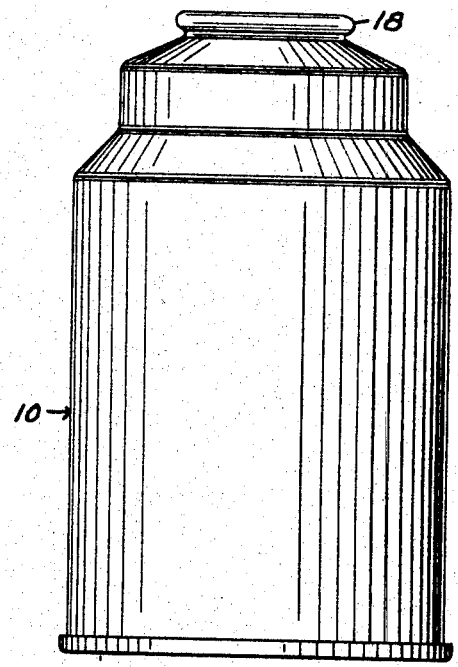
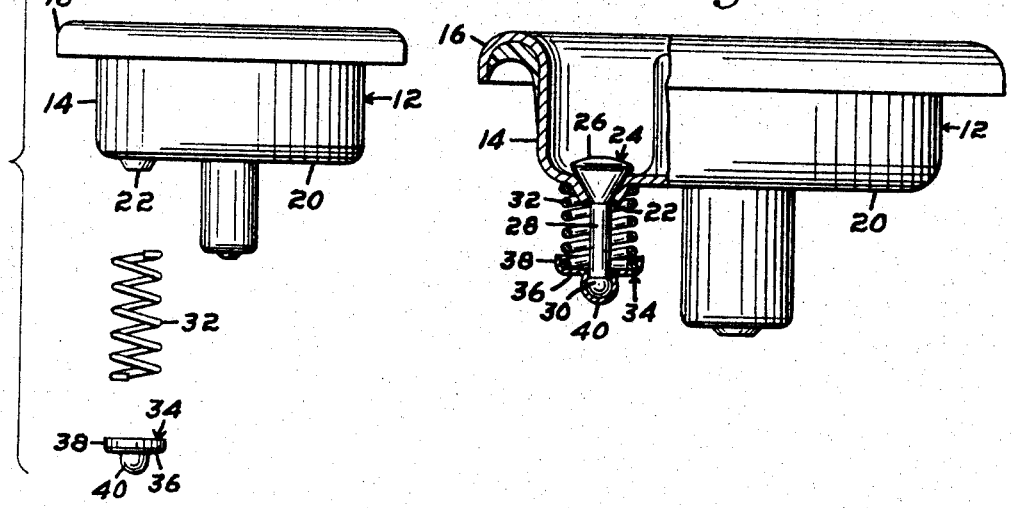
Inventor:
Irving Jay Arons,
by Gador Huelman
Atty.

United States Patent Office

3,404,699
Patented Oct. 8, 1968

3,404,699
SAFETY VALVE WITH FUSIBLE PIN
Irving Jay Arons, West Peabody, Mass., assignor to United-Carr Incorporated, Boston, Mass., a corporation of Delaware
Filed Feb. 25, 1966, Ser. No. 529,832
2 Claims. (Cl. 137—73)

ABSTRACT OF THE DISCLOSURE

This is a safety valve assembly for a pressurized container which includes a pin having a head portion on one end and a knob portion at the other end. The pin is formed of a fusible material and is spring-loaded with a portion of the spring butted against a cup-shaped retainer portion which is crimped around the knob portion.

---

This invention relates generally to valve assemblies and more specifically to valve assemblies for use with pressurized cans.

An object of the present invention is to provide a valve assembly having a fusible safety pin for use therewith.

A further object of the present invention is to provide a spring-loaded fusible safety pin in a valve assembly, for use with pressurized containers, which will deform, thereby completely opening the valve opening.

Present valve assemblies available on the market are formed of either metal or other materials which, if a pressurized can should be accidentally placed in a fire or should otherwise require relief of the internal pressures, may on explosion provide dangerous projectile elements. The applicant's valve is formed of a material which will fuse at a predetermined temperature and since it is spring-loaded be pulled into the can proper, thereby providing a safe release of the pressure contained within the can.

Other objects of the invention will, in part, be obvious and will, in part, appear hereinafter.

In the drawing:

FIG. 1 is a top plan view of a pressurized can having the applicant's safety valve;

FIG. 2 is a side elevation of a can without the cap;

FIG. 3 is an exploded view of the cap of a pressurized can and of the elements of the applicant's valve assembly.

FIG. 4 is a side elevation partly in section of the cap of a pressurized can showing the inventor's valve assembly in place.

In the drawing there is shown a pressurized container 10 and a container cap 12. The container cap 12 comprises a cuplike body portion 14 having its outer free terminal edge 16 bent over to engage the lip 18 of the container 10. The base portion 20 of the well of the body portion 14 in close proximity to a wall thereof has an aperture 22 formed therein whose sides are angled to provide a substantially truncated cone configuration.

The valve assembly comprises a pin 24 having a head 26 in the form of a truncated cone, a shank 28 integral with and extending from the apex of the head 26 and having a diameter smaller than the greatest diameter of the head 26 and a knob portion 30 integral with the terminal end of the shank 28 remote from the head 26, and a helical compression spring 32 which is engaged around the shank 28 and a retainer portion 34. The retainer portion 34 comprises a circular base 36, having an upstanding peripheral wall 38 extending therefrom and having an opening leading into a semispherical hollow knob engaging portion 40.

To engage the valve assembly with the container cap 12, the pin 24 is dropped through the aperture 22, knob portion 30 first, until the head 26 is seated within the aperture 22, and since the largest diameter of the head 26 is greater than the diameter of the hole 22 it thus becomes somewhat set in position. The spring 32 is then brought up around the shank 28 and into abutting relationship with the undersurface of the base portion 20 adjacent the aperture 22 as shown in FIG. 4. The retainer portion 34 is then engaged with the assembly by placing the knob portion 30 into the hollow, knob engaging portion 40 and then crimping, at the juncture between the base 36 and the knob engaging portion 40 with the spring 32 butting against the base 36 thus trapping the spring 32, under compression, between the base 36 of the retainer portion 34 and the base portion 20 of the container cap 12.

If pressure should now build up within the container 10, after the cap 12 is engaged therewith, this pressure would apply against the base 36 of the retainer portion 34 opening the valve assembly by pushing the head 26 from engagement with the aperture 22. If the temperature should become great enough, by whatever cause, the pin 24 being formed of a material which will melt at a predetermined point will first distort and then melt and the spring 32 will pull it as well as the retainer portion 34 within the can, thereby completely opening the aperture 22 and allowing the gas to escape and relieve only dangerous pressures involved.

With reference to the foregoing description it is to be understood that what has been disclosed therein represents only a single embodiment of the invention and is to be construed as illustrative rather than restrictive in nature; and that the invention is best described by the following claims:

I claim:

1. A valve assembly for a pressurized container having a discharge opening at one end thereof, said valve assembly comprising a cup-like body portion having a base portion, said base portion having an aperture formed therethrough, a pin element comprising a cylindrical shank portion having a head formed at one end and an engagement portion formed at the other end, said pin element formed of a fusible material, said head having a diameter greater than said aperture and said shank portion having a diameter slightly less than said aperture, said head portion being in abutting relation to said base portion, adjacent said aperture and said shank extending through said aperture, a helical compression spring circumscribing, in spaced relation said shank and abutting the undersurface of said base portion and a retainer portion having a cup-like knob engaging portion crimped to said engagement portion and butted against said spring and said knob engaging portion opening toward said head whereby said pin element is moveable, throughout said aperture in relation to said base portion.

2. A valve assembly as set forth in claim 1 wherein said head of said pin has the configuration of a truncated cone whose apex is directed at said shank and said engagement portion having the configuration of a knob-like element.

References Cited

UNITED STATES PATENTS

| | | | |
|---|---|---|---|
| 879,508 | 2/1908 | Yeates | 137—74 XR |
| 1,093,576 | 4/1914 | McNutt | 137—73 |
| 1,706,885 | 3/1929 | Imerman | 251—337 |

WILLIAM F. O'DEA, *Primary Examiner.*

R. GERARD, *Assistant Examiner.*